A. SAXEGAARD.
APPARATUS FOR HOUSEHOLD COOKING.
APPLICATION FILED MAY 7, 1914.
1,224,326. Patented May 1, 1917.
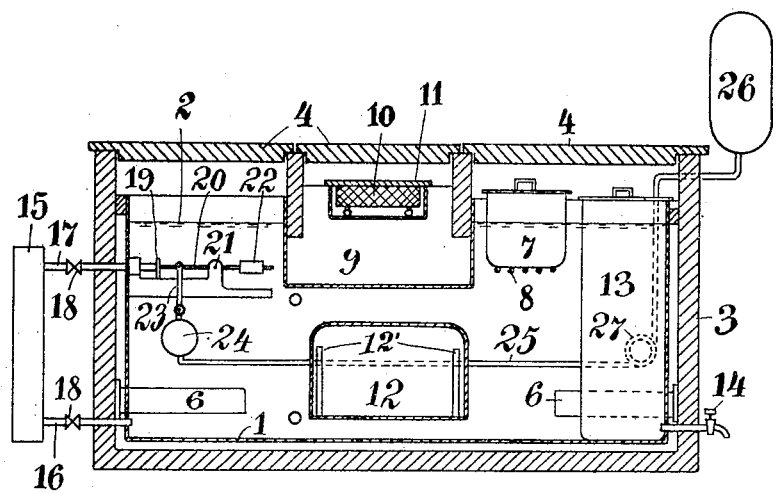

UNITED STATES PATENT OFFICE.

ANDREAS SAXEGAARD, OF STAVANGER, NORWAY.

APPARATUS FOR HOUSEHOLD COOKING.

1,224,326.      Specification of Letters Patent.      Patented May 1, 1917.

Application filed May 7, 1914. Serial No. 837,050.

*To all whom it may concern:*

Be it known that I, ANDREAS SAXEGAARD, subject of the King of Norway, residing at Stavanger, Norway, have invented certain new and useful Improvements in Apparatus for Household Cooking; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to apparatus for house-hold cooking and has for its object to provide an apparatus and a method of cooking whereby it is made possible to utilize the electric current for house-hold cooking processes in an economical manner.

To obtain this result it has been necessary to invent a process and apparatus for cooking processes, which makes it possible to utilize a small quantity of electric power continuously for providing the necessary amount of heat for cooking, which amount of heat may be tapped in a comparatively short interval during the preparation of the meal.

It is a well known fact that for ordinary house-hold cooking purposes it is not necessary to use a temperature of 100° C. (212° F.), but a temperature of about 80° C. (175° F.) is sufficient. This fact I now utilize in my invention by heating a sufficient quantity of water by means of a comparatively weak electric current to 100° C. or boiling point at a period when the available current is not otherwise disposed of and then tapping this accumulated heat by placing pots, etc., with the food to be cooked in the hot water, whereby the water will transfer some of its heat to the food, so that the temperature of the water is lowered. The amount of water used for this purpose therefore must be so great, that between the temperature of 100° and 80° C. (212 and 175° F.) it may yield enough heat for the cooking of a usual family dinner.

After the cooking of the meal is finished, the temperature of the water will have to be raised again as soon as possible so that when the next meal is to be prepared a sufficient quantity of heat is again accumulated.

If however cheap current is not available during the interval between two meals auxiliary devices suitably combined with the cooking apparatus may be resorted to for preparing the next meal.

Further my invention comprises an apparatus for carrying out the said process and devices in connection with said apparatus for different household heating purposes.

The drawing illustrates an apparatus for carrying out the process described, showing a cross section through the apparatus.

The apparatus comprises a tank 1 of copper or other suitable material. This tank 1 is filled with water up to the dotted line 2 and is inclosed by a case 3 of suitable insulating material. The top of this case 3 is formed by covers 4, which may be removed to gain access to the tank 1.

The water contained in the tank 1 is heated in a known way by means of electric resistances placed in tubes or cylinders 6. When it is desired to cook something, a pot 7 is placed on the grate 8, which is mounted a certain distance below the level of the water, so that the pot is surrounded with hot water.

The tank 1 also contains a heating chamber 9, which is heated by the water in the tank, but which is separated from the water and steam portion of the tank. This chamber serves to keep the food hot or eventually to cook the food without making it necessary to put the pots directly into the hot water. On the top of the said chamber 9 is placed a cooking or frying-plate 10, which is covered by an insulating plate 11 and by the cover 4. This frying-plate may be heated separately by means of electric resistances.

The tank also contains a frying chamber 12, which is surrounded on all sides with the hot water, but which may be heated partly by means of separate heating elements 12', so as to raise the temperature inside the said chamber above that of the water.

It will be noted however that any heat not consumed in the said frying-chamber 12 will not be wasted, as it is immediately absorbed by the water in the tank 1. It will also be noted that the frying-chamber 12 as well as the frying-plate 10 will always have a temperature of about 100° C. (212° F.), so that only a small amount of heat is required for attaining the desired temperature for frying purposes. When frying it will usually be necessary to transfer the electric current from heating elements 6 to the heating elements of the frying-plate or the frying-chamber. This will however not prevent cooking, as the heat accumulated in the water will be sufficient for cooking purposes.

One part 13 of the tank 1 is separated from the rest of the tank and serves as a hot water tank for household purposes. This tank 13 is provided with a cock 14.

The apparatus may also be used for the purpose of heating the kitchen. To this end a radiator 15 is attached by means of a lower and upper tube 16, 17 to the tank 1. The hot water will enter the radiator 15 through the tube 17 and as it is cooled, it will sink and reënter the tank 1 through the tube 16. The tubes 16, 17 are provided with valves 18 for shutting off the water, when it is not desired to heat the kitchen. Also I have provided a device for automatically controlling the supply of water to the radiator 15, so that no water is supplied to the same until the water in the tank 1 has been heated to the desired temperature. By this device I attain that only the excess of heat is used for heating the radiator.

In front of the inner opening of the tube 17 is placed a plate 19, which is mounted on one end of a lever 20 pivoted at 21 and provided with a counterweight 22. To this lever 20 is attached by means of a link 23 a float 24, which contains a fluid, the boiling point of which lies below the boiling point of water, and which is connected by means of tube 25 with the dome 26. Instead of using a fluid with a low boiling temperature, one may use water and reduce the pressure in the dome 26, so that the evaporation in the said dome and the float 24 will start at a lower temperature than water under ordinary pressure.

The working of this device is as follows:

When the temperature of the water in the tank 1 is below a certain point, the float 24 will keep the position shown on the drawing, the plate 19 then covering the inner opening of tube 17, so that no water is let into the radiator. When the temperature is raised above a certain point evaporation will take place in the float 24, the upper part of which will be filled with steam, so that the water in the float is forced by the steam generated therein through the tube 25 into the dome 26. As the float is then lighter than before, it will raise and swing the lever 20 with the plate 19, so that the opening of tube 17 is uncovered, and hot water will circulate through the radiator. If the temperature of the water in the tank 1 is again lowered for instance by cooking, the steam in the float 24 will condense, so that the float is again filled with water and returns to its ordinary position shutting off the inlet to tube 17. The long tube 25 will not offer much resistance to the movement of the float 24 and to lessen this resistance still further the tube may be provided with a coil 27.

Claim:

A domestic cooker comprising an insulated main tank forming a water reservoir, means for electrically heating the water therein, an auxiliary water receptacle mounted in the reservoir adapted to be heated by the water in the latter, means for drawing the water from the receptacle, an oven surrounded and heated by the water in the reservoir, and electrical means for independently heating the oven above the temperature of the water, and operating as an auxiliary means for heating the latter.

In testimony that I claim the foregoing as my invention, I have signed my name in the presence of two subscribing witnesses.

ANDREAS SAXEGAARD.

Witnesses:
M. E. GUTTORUSSEN,
RUTH LINDSTRÖM.